(12) United States Patent  (10) Patent No.: US 8,244,123 B2
Sugahara  (45) Date of Patent: Aug. 14, 2012

(54) SYSTEM AND METHOD FOR OPTICAL TRANSMISSION

(75) Inventor: Hiromitsu Sugahara, Tokyo (JP)

(73) Assignee: NEC Corporation, Tokyo (JP)

( * ) Notice: Subject to any disclaimer, the term of this patent is extended or adjusted under 35 U.S.C. 154(b) by 726 days.

(21) Appl. No.: 12/396,038

(22) Filed: Mar. 2, 2009

(65) Prior Publication Data

US 2009/0226163 A1 Sep. 10, 2009

(30) Foreign Application Priority Data

Mar. 4, 2008 (JP) ................................. 2008-053064

(51) Int. Cl.
 *H04B 10/00* (2006.01)
 *H04B 10/08* (2006.01)
(52) U.S. Cl. ....................... 398/5; 398/1; 398/2; 398/32
(58) Field of Classification Search .................. 398/1–2, 398/5, 32
 See application file for complete search history.

(56) References Cited

U.S. PATENT DOCUMENTS 7,289,728 B2 * 10/2007 Wang et al. ........................ 398/5

FOREIGN PATENT DOCUMENTS

| JP | 1992334135 A | 11/1992 |
|---|---|---|
| JP | 2000269890 A | 9/2000 |
| JP | 2000358261 A | 12/2000 |
| JP | 2001044939 A | 2/2001 |
| JP | 2002523921 A | 7/2002 |

\* cited by examiner

*Primary Examiner* — Jessica Stultz
*Assistant Examiner* — Michael Carter

(57) ABSTRACT

In an optical transmission system, a first monitoring section configured to monitor a first optical signal on a first optical transmission line to detect a first failure. A modulating section generates a second optical signal obtained through modulation of a signal corresponding to the first optical signal based on the first failure, to transmit the second optical signal onto a second optical transmission line which is connected with the first optical transmission line and a terminal unit. A second monitoring section monitors the second optical signal on the second optical transmission line to detect a second failure, and a detecting section detects the first failure from the second optical signal on the second optical transmission line. A line switch configured to selectively switch an optical transmission line to be connected with the terminal unit, from the second optical transmission line to another optical transmission line based on the first failure detected by the detecting section and the second failure detected by the second monitoring section.

24 Claims, 6 Drawing Sheets

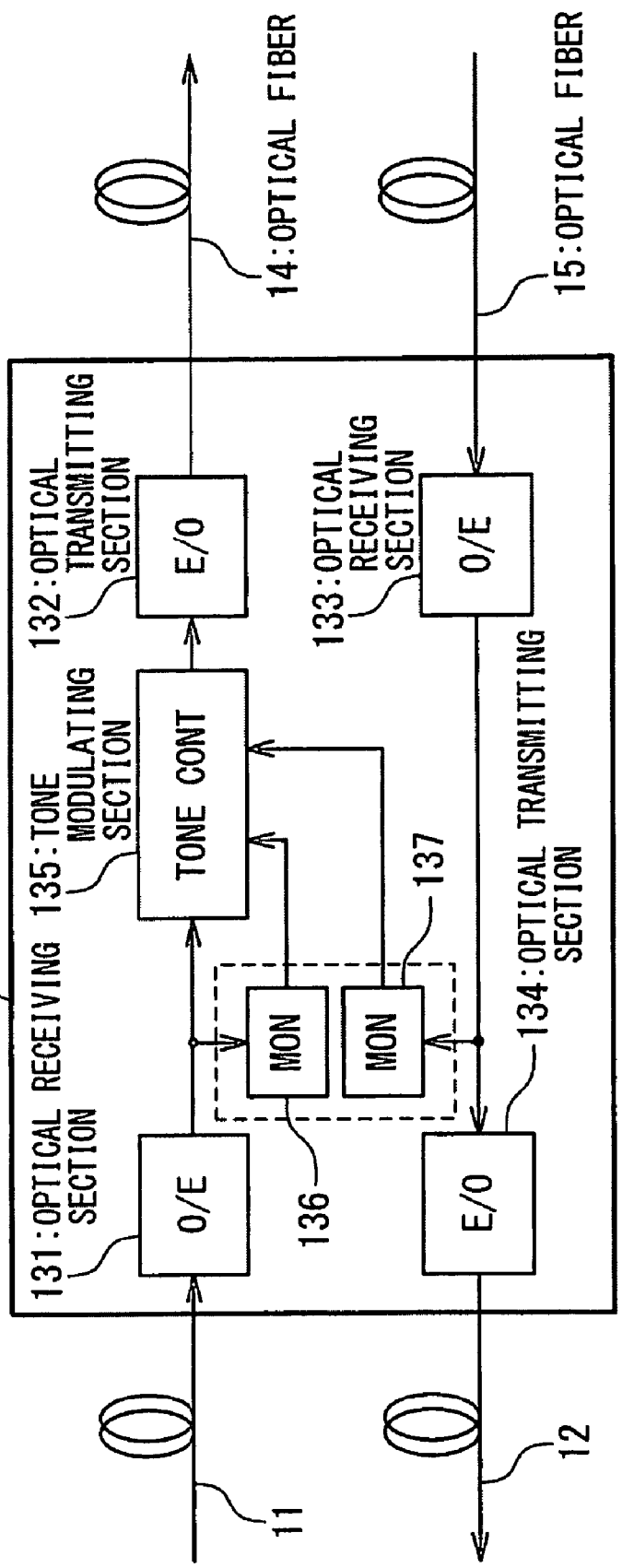

Fig. 4

| SERVICE SYSTEM \ PROTECTION SYSTEM | NO ALARM | TRANSMISSION LINE LOS | TRANSMISSION LINE ERR | OPTICAL FIBER LOS | OPTICAL FIBER ERR |
|---|---|---|---|---|---|
| NO ALARM | NO SWITCHING | NO SWITCHING | NO SWITCHING | NO SWITCHING | NO SWITCHING |
| TRANSMISSION LINE LOS | SWITCHING | DISCONNECT | SWITCHING | DISCONNECT | SWITCHING |
| TRANSMISSION LINE ERR | SWITCHING | NO SWITCHING | NO SWITCHING | NO SWITCHING | NO SWITCHING |
| OPTICAL FIBER LOS | SWITCHING | DISCONNECT | SWITCHING | DISCONNECT | SWITCHING |
| OPTICAL FIBER ERR | SWITCHING | NO SWITCHING | NO SWITCHING | NO SWITCHING | NO SWITCHING |

SYSTEM AND METHOD FOR OPTICAL TRANSMISSION

INCORPORATION BY REFERENCE

This patent application claims priority on convention based on Japanese Patent Application No. 2008-053064. The disclosure thereof is incorporated herein by reference.

TECHNICAL FIELD

The present invention relates to an optical transmission system having a redundant optical transmission line, an optical transmitting & receiving unit used therefor, a terminal side transmitting & receiving unit station, and an optical transmission method.

BACKGROUND ART

In recent years, along with the wide spread of an optical transmission system for transmitting a data by using an optical signal, a large volume of data has been able to be transmitted. The optical transmission system includes a plurality of nodes connected by optical transmission lines exemplified by optical fibers. Typically, in order to avoid failure such as loss of frame (out of synchronization) of an optical signal or a physical breakdown of the optical fiber, an optical transmission line between the nodes includes duplicated optical transmission lines for a service system and a protection system.

On the other hand, an optical transmission system for an optical communication network includes an optical transmitting & receiving unit mounting station (line concentration station) connected to a host station through an optical transmission line; and a terminal side transmitting & receiving unit provided between a terminal unit and the line concentration station. The terminal side transmitting & receiving unit is connected to the line concentration station through a drop cable (optical fiber). The terminal unit is connected to the optical communication network through the terminal side transmitting & receiving unit mounting station, and communicates with another terminal unit or server in the network.

In such an optical transmission system, a line from a host station to the terminal side transmitting & receiving unit mounting station is preferably made redundant by duplicate or multiple transmission lines. In this case, the optical transmission system is generally provided with a selector for switching the optical transmission line between the host station and the terminal unit. A signal supplied from the host station side through the duplicate optical transmission lines is selected by the selector and then outputted to the terminal unit. Also, a signal supplied from the terminal unit is outputted to the host station side through the optical transmission lines selected by the selector.

The selector typically selects a service system optical transmission line as an optical transmission line for connecting between the host station side and the terminal unit. When any failure has occurred in the service system optical transmission line, the selector switches to a protection system optical transmission line. Also, the selector is required to switch the optical transmission line to be used on the basis of a failure state of the optical transmission line in use as a communication line. For this reason, the above-described optical transmission system needs to be provided with a unit adapted to monitor failure states of the transmission lines.

An example of a technique for monitoring a failure state in an optical transmission system having a redundant optical transmission line, or a technique for switching a transmission line on the basis of a monitoring result is disclosed in the following related arts.

For example, a technique for switching to a protection system optical transmission line in response to a break of an optical fiber is described in Japanese Patent Application Publication (JP-P1992-334135A, related art 1). In the related art 1, each of transmission lines duplicated by a directional coupler is provided with an optical receiver for detecting the break of the transmission line. The optical receiver converts an optical signal into an electrical signal, to detect the break of the transmission line, and outputs an alarm data for controlling a switch for switching the transmission line.

Japanese Patent Application Publication (JP-P2000-269890A, related art 2) describes that if any failure has occurred in a service system transmission line between terminal stations, an optical switch provided in the terminal station having detected the failure switches the optical transmission line between the service and protection systems.

Japanese Patent Application Publication (JP-P2000-358261A, related art 3) describes an optical cross-connector apparatus that monitors a line for an optical signal set in an apparatus without affecting the optical signal (service signal) to be transmitted. In the technique described in the related art 3, connection destinations of a plurality of input side optical transmission lines are selected from a plurality of output side optical transmission lines by an optical switch. At this time, the service signal transmitted in the optical switch is subjected to light intensity modulation by a monitor signal. An optical line monitoring section refers to the monitor signal extracted from a light-intensity-modulated optical signal to identify an optical transmission line selectively connected by the optical switch, and grasps a failure state of each of the optical transmission lines. The optical switch is controlled on the basis of the failure state to determine input and output side transmission lines to be connected.

Also, a technique for switching a transmission line without use of a selector having a switching function is described in Japanese International Patent Application Publication (JP-P2002-523921A, related art 4). In an optical transmission system described in the related art 4, by attenuating a signal in any one of duplicated transmission lines, one transmission line is brought into a standby state, and the other is brought into an operation state. An amplifier on the transmission line in the standby state supplies pumping energy of a low level to an optical fiber doped with fluorescent material. Thus, an incoming optical signal is attenuated by the optical fiber doped with fluorescent material, and amplified natural radiation is generated from the optical fiber. At this time, a pumping laser is current-modulated by a low frequency signal, and the amplified natural radiation is modulated. The modulated natural radiation is detected by a receiver on the transmission line as a control tone.

In an optical transmission system described in the related art 4, the receiver provided on the transmission line monitors a signal level on the transmission line in the operation state to detect a failure having occurred on the transmission line. For example, if the failure is detected by the receiver on the operating transmission line (service system transmission line), an amplifier on the service system transmission line performs the above-described operation, and an amplifier on a transmission line in the standby state (protection system transmission line) is switched to perform a normal operation. Also, when the control tone is not detected on the protection system transmission line, the above switching operation is stopped.

Further, Japanese Patent Application Publication (JP-P2001-44939A, related art 5) describes a technique for grasping an operation state of an optical amplifier on the basis of data from the optical amplifier provided in the middle of an undersea optical fiber cable. An optical amplifier provided undersea described in the related art 5 superposes a state signal or a control signal on an optical signal with low frequency modulation to output the superposed signal to a ground station. At this time, a type of low frequency modulation is set to be different for each optical amplifier and also for each operation state. For this reason, the ground station can grasp a state of each optical amplifier by detecting the type of modulation.

On the other hand, in an optical transmission system in which a terminal unit is connected to a host station through a line concentration station and a terminal side transmitting & receiving unit, an optical transmission line needs to be switched on the basis of a failure state of an optical transmission line between the host station and the line concentration station and a failure state of an optical transmission line between the line concentration station and the terminal side transmitting & receiving unit. That is, in the optical transmission system, the optical transmission line to be used is selected according to the failure states on the upstream and downstream sides of the line concentration station.

However, in any of the above-described related arts 1 to 4, such an optical transmission system is not disclosed that an optical transmission line is selected according to the failure states on the upstream and downstream sides. On the other hand, in the related art 5, a technique for switching an optical transmission line to be used in consideration of failure states of transmission lines on upstream and downstream sides is described. However, it is necessary to provide another transmission line for transmitting the failure states separately from the optical transmission lines. In this case, the transmission line for transmitting the failure state must be provided, and therefore an entire system cost increases. In particular, when a unit for detecting the failure state and a unit for switching the transmission line are far from each other, an increase in cost due to the transmission line for transmitting the failure state becomes significant.

SUMMARY

An object of the present invention is to provide an optical transmission system, an optical transmitting & receiving unit, and a terminal side transmitting & receiving unit in which reliability is improved while suppressing cost.

In an aspect of the present invention, an optical transmission system includes: first and second optical transmission lines; a first monitoring section configured to monitor a first optical signal on the first optical transmission line to detect a first failure; a modulating section configured to generate a second optical signal obtained through modulation of a signal corresponding to the first optical signal based on the first failure, to transmit the second optical signal onto the second optical transmission line which is connected with the first optical transmission line and a terminal unit; a second monitoring section configured to monitor the second optical signal on the second optical transmission line to detect a second failure; a detecting section configured to detect the first failure from the second optical signal on the second optical transmission line; and a line switch configured to selectively switch an optical transmission line to be connected with the terminal unit, from the second optical transmission line to another optical transmission line based on the first failure detected by the detecting section and the second failure detected by the second monitoring section.

In another aspect of the present invention, an optical transmitting and receiving apparatus includes: a first monitoring section configured to monitor a first optical signal on a first optical transmission line to detect a first failure, the first optical transmission line connected with a terminal apparatus through a second optical transmission line; and a modulating section configured to generate a second optical signal obtained through modulation of a signal corresponding to the first optical signal based on the first failure to transmit the second optical signal onto the second optical transmission line. An optical transmission line to be connected with the terminal apparatus is switched from the second optical transmission line to another optical transmission line based on the first failure detected from the second optical signal and a second failure detected from the second optical signal by a second monitoring section.

In still another aspect of the present invention, an optical transmitting and receiving apparatus includes: a detecting section configured to detect a first failure detected from a first optical signal on a first optical transmission line connected with a terminal apparatus through a second optical transmission line, from a second optical signal transmitted through the second optical transmission line; a second monitoring section configured to monitor the second optical signal on the second optical transmission line to detect a second failure; and a line switch configured to selectively switch an optical transmission line to be connected with the terminal apparatus from the second optical transmission line to another optical transmission line based on the first failure and the second failure.

Also, in an aspect of the present invention, an optical transmission method is attained: by monitoring a first optical signal on a first transmission line connected with a terminal unit through a second optical transmission line, to detect a first failure; by modulating an signal corresponding to the first optical signal on the first optical transmission line based on the first failure to transmit a second optical signal on the second optical transmission line; by monitoring a second failure from the second optical signal on the second optical transmission line; by detecting the first failure from the second optical signal on the second optical transmission line; and by switching an optical transmission line to be connected with the terminal unit from the second optical transmission line to another optical transmission line based on the first failure and the second failure.

According to the optical transmission system, the optical transmitting & receiving apparatus, and the terminal side transmitting & receiving apparatus of the present invention, reliability of the optical transmission system in which an optical transmission line is made redundant can be improved with cost being suppressed.

BRIEF DESCRIPTION OF DRAWINGS

The above and other objects, advantages and features of the present invention will be more apparent from the following description of certain exemplary embodiments taken in conjunction with the accompanying drawings, in which:

FIG. 3 is a diagram showing a configuration of an optical transmitting & receiving unit used in the optical transmission system of the second exemplary embodiment;

FIG. 4 is a diagram showing an example of a determination condition table in which transmission line switching conditions are stored;

EXEMPLARY EMBODIMENTS

Figure 1:
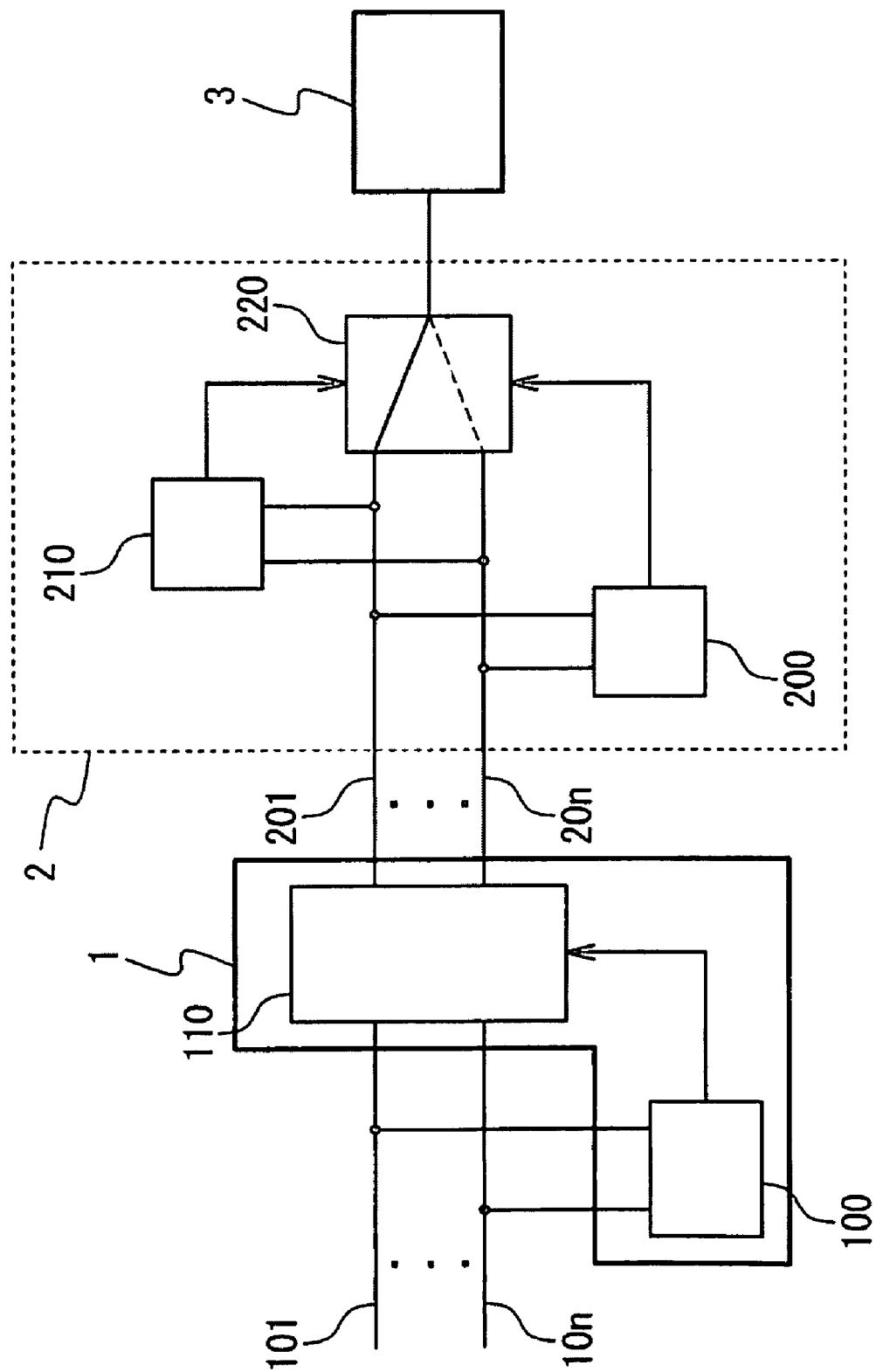
FIG. 1 is a diagram showing a configuration of an optical transmission system according to a first exemplary embodiment of the present invention.

Hereinafter, an optical transmission system according to the present invention will be described with reference to the attached drawings. In the drawings, the same or similar reference numerals indicate the same or similar components.

First Exemplary Embodiment

FIG. 1 is a diagram showing a configuration of the optical transmission system according to a first exemplary embodiment of the present invention. Referring to FIG. 1, the optical transmission system in the first exemplary embodiment includes a first monitoring section 100, a modulating section 110, a second monitoring section 200, a detecting section 210, and a selector 220. It should be noted that the first monitoring section 100 and the modulating section 110 are preferably provided in an optical transmitting & receiving unit mounted station 1 serving as a line concentration station in an optical network system, but the present invention is not limited to this. Also, the second monitoring section 200, the detecting section 210, and the selector 220 are preferably provided in a terminal side optical transmitting & receiving unit station 2 which performs a switching operation of a transmission line from the optical transmitting & receiving unit mounted station 1 to a terminal unit 3 (e.g., client terminal).

The first monitoring section 100 monitors a plurality of first optical transmission lines 101 to 10n to detect failure states of the first optical transmission lines 101 to 10n. The modulating section 110 modulates an optical signal transmitted through each of the first optical transmission lines 101 to 10n to transmit the modulated signal onto any of second optical transmission lines 201 to 20n on the basis of a first failure state detected by the first monitoring section 100. The second monitoring section 200 monitors second optical transmission lines 201 to 20n to detect failures of the second optical transmission lines 201 to 20n. The detecting section 210 detects and extracts a first failure from an optical signal transmitted through any of the second optical transmission lines 201 to 20n. The selector 220 selects one of the optical transmission lines 201 to 20n, which is to be connected to the terminal unit 3, on the basis of the first failure detected by the detecting section 210 and a second failure detected by the second monitoring section 200.

It is assumed that the first optical transmission line 101 and the second optical transmission line 201 as current use lines are connected to the terminal unit 3 by the selector 220. The first monitoring section 100 monitors the first optical transmission lines 101 to 10n and detects the first failure, which indicates a failure of the first optical transmission line 101 as the current use line connected to the terminal unit 3 in this example, and then outputs a data of the first failure to the modulating section 110. The modulating section 110 modulates an optical signal transmitted through the first optical transmission line 101 on the basis of the first failure data. For example, the modulating section 110 tone-modulates the optical signal on the optical transmission line 101 with a tone signal corresponding to the first failure. The tone-modulated optical signal is transmitted onto the second optical transmission line 201 as the current use line.

The detecting section 210 demodulates the optical signal transmitted on each of the second optical transmission lines 201 to 20n and detects the tone signal from the demodulated signal. In this example, the tone signal is detected from the optical signal transmitted through the second optical transmission line 201. The detecting section 210 outputs the first failure corresponding to the detected tone signal to the selector 220. The second monitoring section 200 monitors the second optical transmission lines 201 to 20n and detect a second failure, which indicates a second failure of the second optical transmission lines 201 as the current use line in this example, and outputs a data of the second failure to the selector 220.

On the basis of the first failure supplied from the detecting section 210 and the second failure supplied from the second monitoring section 200, the selector 220 switches the second optical transmission line to be connected to the terminal unit 3. For example, if the first failure indicating a failure of the first optical transmission line 101 and the second failure indicating no failure on the second optical transmission line 201 are supplied, the selector 220 switches from the second optical transmission line 201 connected to the terminal unit 3 to the second optical transmission line 20n. Thus, an optical transmission line for the optical signal to the terminal unit 3 is changed to the first optical transmission line 10n and the second optical transmission line 20n.

The selector 220 may select a predetermined optical transmission line to be connected to the terminal unit 3, or select an optical transmission line having no failure to be connected to the terminal unit 3. Also, an optional transmission line to be selectively connected by the selector 220 is preferably determined according to a combination of the first failure and the second failure. For example, the selector 220 may switch an optical transmission line to another optical transmission line when a failure has occurred in one of the first optical transmission line 101 and the second optical transmission line 201. Also, preferably, it is determined whether or not the optical transmission line to be connected to the terminal unit 3 is changed, based on a degree of each of the first and second failures. In this case, as will be described later, preferably, a table in which the first failure, the second failure and a second optical transmission line to be selectively connected (or disconnected) are related to each other as a combination is provided in a storage unit. By referring to the table, the selector 220 can select the optical transmission line to be connected to the terminal unit 3 based on the combination of the first failure and the second failure.

As described above, according to the present invention, the optical transmission line connected to the terminal unit can be determined based on a combination of the first failure in each of the first optical transmission lines 101 to 10n between the optical transmitting & receiving unit mounted station 1 and a host station (not shown) and the second failure in each of the second optical transmission lines 201 to 20n between the optical transmitting & receiving unit mounted station 1 and the terminal side optical transmitting and receiving unit station 2. For this reason, reliability of the optical transmission system can be improved.

Also, in the present invention, the optical transmission line connected to the terminal unit is switched based on the combination of the first failure on an upstream side and the second failure on a downstream side with respect to the optical transmitting & receiving unit mounted station 1. For this reason, detailed setting of the optical transmission line depending on severity of failure and position of the failure becomes possible.

In the following description, a configuration and an operation of the optical transmission system according to the present invention will be described in detail by use of second and third exemplary embodiments Second Exemplary Embodiment (Configuration of Optical Transmission System)

Figure 2:
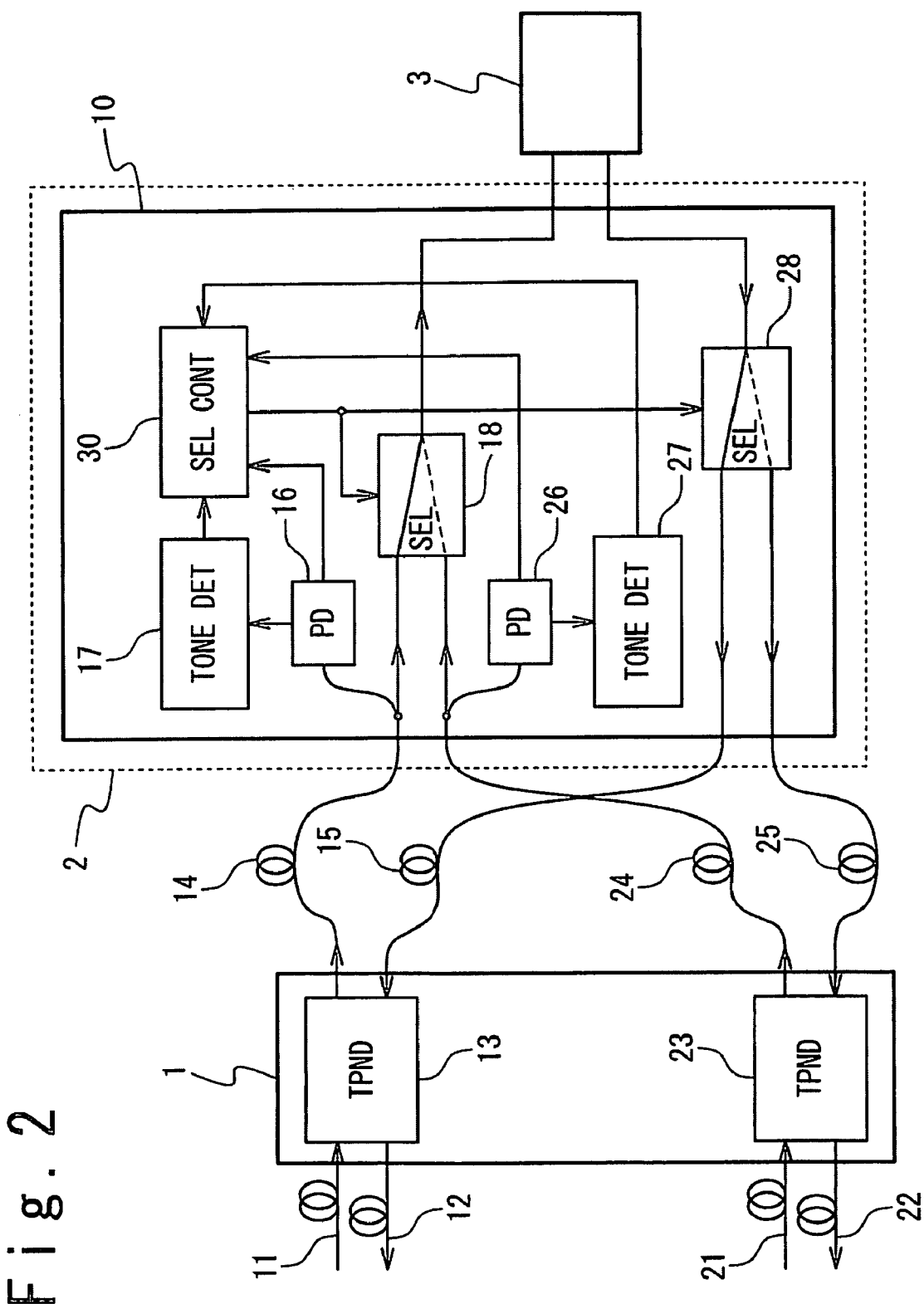
FIG. 2 is a diagram showing a configuration of the optical transmission system according to a second exemplary embodiment of the present invention.

FIG. 2 is a diagram showing a configuration of the optical transmission system according to a second exemplary embodiment of the present invention. Referring to FIG. 2, the optical transmission system includes an optical transmitting & receiving unit mounted station 1 (hereinafter, to be referred to as a line concentration station 1) connected to a host station (not shown); a terminal side optical transmitting & receiving unit mounted station 2 (hereinafter, to be referred to as a terminal side unit mounted station 2) for relaying between the line concentration station 1 and a terminal unit 3; and the terminal unit 3. The line concentration station 1 is connected to a communication network through the host station (not shown). The terminal side transmitting & receiving unit mounted station 2 is connected to the line concentration station 1 through a drop cable (optical fiber). The terminal unit 3 is connected to a communication network through the terminal side unit mounted station 2, and communicates with another terminal unit or server within the network.

The optical transmission lines between the host station (not shown) and the line concentration station 1 are duplicated to two sets of optical transmission lines 11 and 12, and 21 and 22. Also, a transmission line between the line concentration station 1 and the terminal side unit mounted station 2 is duplicated to two sets of optical fibers 14 and 15, and 24 and 25. It should be noted that the optical transmission lines 11 and 21, and optical fibers 14 and 24 are for a down-route line, whereas the optical transmission lines 12 and 22, and optical fibers 15 and 25 are for an up-route line.

The line concentration station 1 is typically provided at a location far from the terminal side unit mounted station 2. For example, the line concentration station 1 is provided in a station building managed by a telecommunication carrier, and the terminal side unit mounted station 2 is installed near the building installed with the terminal unit 3 or in the same building as that installed with the terminal unit 3.

The line concentration station 1 includes a plurality of optical transmitting & receiving units. In the present exemplary embodiment, the line concentration station 1 includes an optical transmitting & receiving unit 13 for relaying between the optical transmission lines 11 and 12 and the service system optical fibers 14 and 15; and an optical transmitting & receiving unit 23 for relaying between the protection system optical transmission lines 21 and 22 and the protection system optical fibers 24 and 25.

The optical transmitting & receiving unit 13 monitors the optical transmission line 11 and the optical fiber 15, and tone-modulates an optical signal supplied through the optical transmission line 11 on the basis of a result of the monitoring, to output the tone-modulated optical signal to the optical fiber 14. Similarly, the optical transmitting & receiving unit 23 monitors the optical transmission line 21 and optical fiber 25, and tone-modulates an optical signal supplied through the optical transmission line 21 on the basis of a result of the monitoring, to output the tone-modulated optical signal to the optical fiber 24.

A detailed configuration of the optical transmitting & receiving unit 13 will be described with reference to FIG. 3. It should be noted that a configuration of the optical transmitting & receiving unit 23 is the same as that of the optical transmitting & receiving unit 13, and therefore description thereof is omitted.

The optical transmitting & receiving unit 13 includes optical receiving sections 131 and 133, optical transmitting sections 132 and 134, tone modulating section 135, and monitoring units 136 and 137. The optical receiving section 131 photoelectric-converts the optical signal supplied through the optical transmission line 11 (from the host station). The monitoring section 136 monitors and analyzes an electrical signal to which the optical signal is converted by the optical receiving section 131, and detects a failure on the optical transmission line 11 such as input signal loss (loss of signal), line break, and loss of frame. Also, the monitoring section 136 outputs as the failure data, a tone signal having a frequency corresponding to the detected failure to the tone modulating section 135. Similarly, the optical receiving section 133 photoelectric-converts an optical signal supplied through the optical fiber 14 (from the terminal unit side). The monitoring section 137 monitors and analyzes an electrical signal to which the optical signal is converted by the optical receiving section 133, and detects a failure on the optical fiber 14 such as input signal loss, line break, and loss of frame. Also, the monitoring unit 137 outputs as failure data, a tone signal having a frequency corresponding to the detected failure to the tone modulating section 135. It should be noted that the tone signal is preferably has the frequency that is different for each of the optical transmission lines in which the failure has been detected, and for each of failure contents (such as loss of frame, and loss of signal). Each of the monitoring sections 136 and 137 outputs to the tone modulating section 135 a tone signal corresponding to the optical transmission line in which failure has been detected and the failure content.

The tone modulating section 135 uses the tone signals supplied from the monitoring sections 136 and 137 to modulate the electrical signal (corresponding to a carrier wave signal of the optical signal supplied through the optical transmission line 11) outputted from the optical receiving section 131 (tone modulation). It should be noted that if no tone signal is supplied from the monitoring sections 136 and 137, the tone modulating section 135 supplies the electrical signal from the optical receiving section 131 to the optical transmitting section 132 as it is (through). Also, it should be noted that the tone modulating section 135 is only required to be able to modulate the electrical signal from the optical receiving section 131 based on the failure data outputted from the monitoring sections 136 and 137, and may modulate the electrical signal on the basis of a modulation method other than the tone modulation. In this case, preferably, the monitoring sections 136 and 137 output signals corresponding to the failures to the tone modulating section 135 (modulating section).

The optical transmitting section 132 converts the electrical signal outputted from the tone modulating section 135 into an optical signal to generate a conversion optical signal and outputs the conversion optical signal onto the optical fiber 14 (terminal unit side). At this time, if the electrical signal is tone-modulated, a tone-modulated optical signal is outputted. On the other hand, the optical transmitting section 134 converts the electrical signal into which the optical signal is converted by the optical receiving section 133 into an optical signal to generate a conversion optical signal and outputs it onto the optical transmission line 12 (host station side).

Referring to FIG. 2, the terminal side unit mounted station 2 includes a terminal side optical transmitting & receiving unit 10 for relaying between the line concentration station 1 and the terminal unit 3. The terminal side optical transmitting & receiving unit 10 includes photodiode modules 16 and 26 (hereinafter to be referred to as PDs 16 and 26), tone detecting sections 17 and 27, selectors 18 and 28, and a selector control section 30.

The selector 18 is connected with a service system down-route line (optical fiber 14) and a protection system down-route line (optical fiber 24). The selector 18 selects one of the optical fibers 14 and 24 in response to a control signal from the selector control section 30, and outputs the optical signal supplied through the selected optical fiber to the client terminal 3. That is, the selector 18 selects one of a plurality of down-route transmission lines (two in this case) to connect the selected down-route transmission line to the terminal unit 3.

The selector 28 is connected with the service system up-route line (the optical fiber 15) and the protection system up-route line (the optical fiber 25). The selector 28 selects one of the optical fibers 15 and 25 in response to the control signal from the selector control section 30, and outputs the optical signal supplied from the terminal unit 3 to the selected optical fiber. That is, the selector 28 selects one of a plurality of up-route optical transmission lines (two in this example) to connect the selected up-route optical transmission line to the terminal unit 3.

In addition, to reduce an area cost and a power consumption amount, an optical switch is preferably used as the selector 18.

The down-route optical fiber 14 is connected with the PD 16. The PD 16 converts the optical signal supplied through the optical fiber 14 into an electrical signal. The tone detecting section 17 monitors and analyzes the electrical signal to which the optical signal is converted by the PD 16, and detects or extracts the tone signal. Also, the tone detecting section 17 extracts alarm data (e.g., transmission line ERR) corresponding to the tone signal from a table (not shown) to output the alarm data to the selector control section 30. In addition, if the PD 16 monitors and detects disconnection of input of the optical signal on the optical fiber 14, it outputs the alarm data indicating the line disconnection of the optical fiber 14 to the selector control section 30.

Similarly, the down-route optical fiber 24 is connected with the PD 26. The PD 26 converts the optical signal transmitted through the optical fiber 24 into an electrical signal. The tone detecting section 27 monitors and analyzes the electrical signal to which the optical signal is converted by the PD 26, and detects or extracts the tone signal. Also, the tone detecting section 27 detects and extracts alarm data (e.g., transmission line ERR) corresponding to the tone signal from a table (not shown) to output it to the selector control section 30. In addition, if the PD 26 monitors and detects input signal loss of the optical signal from the optical fiber 24, it outputs the alarm data indicating the line signal loss of the optical fiber 24 to the selector control section 30.

The selector control section 30 controls the selectors 18 and 28 on the basis of the alarm data supplied from the tone detecting sections 17 and 27 and PDs 16 and 26. A method for controlling the selectors 18 and 28 will be described later. However, a transmission line switching control from the service system to the protection system is preferably performed simultaneously for the up- and down-route sides. That is, preferably, the selector control section 30 simultaneously controls the selectors 18 and 28 to simultaneously perform switching for up- and down-route lines used by the terminal unit 3.

The selector control section 30 refers to a determination condition table illustrated in FIG. 4 on the basis of the alarm data to determine optical transmission lines to be connected to the terminal unit 3. It should be noted that the alarm data may be extracted in the selector control section 30. In such a case, the tone detecting sections 17 and 27 output the detected tone signals to the selector control section 30, and the alarm data are extracted in the selector control section 30. An occurrence position of failure may be determined by a PD or a tone detecting section into which corresponding alarm data are outputted, or on the basis of the tone signal. However, in case of determination based on the tone signal, the tone signal should be set in association with each of the transmission lines.

Now, an example of the determination condition table to be referred in switching of an optical transmission line to be used will be described. The selector control section 30 can extract, from an input signal from the down-route optical transmission line and an input signal from the down-route optical fiber, for example, the following alarms. That is, the alarm data to be extracted are: in the down-route optical transmission lines 11 and 21, loss of signal (LOS), loss of frame (LOF), signal degrade (SD), and error rate (ERR); in the down-route optical fibers 14 and 24, loss of signal (LOS); and in the up-route optical fibers 15 and 25, loss of signal (LOS). It should be noted that when the PDs 16 and 26 are added with the same functions as those of the monitoring sections 136 and 137, respectively, loss of signal (LOS), loss of frame (LOF), signal degrade (SD), and error rate (ERR) in the up-route optical fiber 15 and 25 can also be extracted.

Referring to FIG. 4, in a determination condition table related to the present invention, a transmission line switching manner corresponding to a combination of pieces of alarm data from any of the protection system optical transmission line and the optical fiber and from any of the service system optical transmission line and the optical fiber is recorded.

As an example, alarm severity is set in the order of LOS>LOF>SD>ERR>No alarm. For example, if service system alarm data indicates "No alarm", the selector control section 30 does not switch any transmission line even if protection system alarm data indicates any detail. Also, in the case where the service system alarm data indicates "Transmission line LOS", and the protection system alarm data indicates "Transmission line ERR", the selector control section 30 performs transmission line switching control. Further, in the case where the service system alarm data indicates "Optical fiber LOS", and the protection system alarm data indicates "Transmission line LOS", the selector control section 30 controls the selectors 18 and 28 to disconnect all lines. The other combinations are as illustrated in FIG. 4. In addition, a more detailed condition may be set by incorporating pieces of alarm data for transmission line switching, such as out of frame synchronization (LOF) and error rate deterioration (SD) of each of the optical transmission lines and optical fibers, although this is not illustrated in the diagram.

In the above configuration, the terminal side transmitting & receiving unit 10 and the terminal unit 3 are provided separately from each other; however, the both may be provided in one and the same device. Also, the number of the terminal units 3 connected to the terminal side transmitting & receiving unit 10 is typically not one. In this case, between each of the plurality of terminal units 3 and the line concentration station 1, duplicated transmission lines as described above are provided.

(Operations)

Next, with reference to FIGS. 2 to 4, an operation of the optical transmission system according to the present invention will be described in detail.

The failure details to be monitored in the optical transmission system according to the present invention are different between the up-route lines and the down-route lines. In the case of the down-route lines (optical transmission lines 11 and 21, and optical fibers 14 and 24), the failure details to be monitored are failures such as loss of optical signal, line break, and loss of frame in each of the optical transmission lines 11 and 12, and the optical input signal disconnection in each of the optical fibers 14 and 24. In the case of the up-route lines (optical transmission lines 12 and 22, and optical fibers 15 and 25), the failure details to be monitored are failures such as loss of optical signal, line break, and loss of frame in each of the optical fibers 15 and 25. However, if the PDs 16 and 26 are added with the same functions as those of the monitoring sections 136 and 137, the PDs 16 and 26 will be able to monitor failures such as loss of optical signal, line break, and loss of frame in each of the down-route optical fibers 14 and 24.

During normal operation, the optical transmission lines 11 and 12 and the optical fibers 14 and 15 function as service system transmission lines, and the terminal unit 3 communicates with the host station (or the other terminal unit connected through the host station). If no failure occurs in any of the optical transmission lines 11, 12, 21, and 22, and optical fibers 14, 15, 24, and 25 during the normal operation, the optical signals transmitting through the optical fibers 14 and 24 are not tone-modulated. For this reason, the tone detecting section 17 and 27 do not detect any tone signal, and therefore do not output any alarm data. Also, the PDs 16 and 26 do not detect any optical fiber disconnection, and therefore do not output any alarm data. Accordingly, the selector control section 30 refers to the determination condition table illustrated in FIG. 4, and then does not perform any switching control. That is, the service system transmission lines in current use are maintained.

For example, in the case where the transmission line ERR occurs in the optical transmission line 11 in the service system down-route line, the monitoring section 136 in the optical transmitting & receiving unit 13 outputs a tone signal corresponding to the transmission line LOS to the tone modulating section 135. The optical transmitting & receiving unit 13 outputs an optical signal modulated with the tone signal to the terminal side transmitting & receiving unit 10 through the optical fiber 14. In this case, in the case where the other transmission lines have no failure, the selector control section 30 of the terminal side transmitting & receiving unit 10 obtains alarm data (error occurs in the service system optical transmission line 11) from the optical signal supplied through the optical fiber 14. In this case, the selector control section 30 refers to the determination condition table illustrated in FIG. 4, and controls the selectors 18 and 28 to switch between the service system transmission line and the protection system transmission line. Based on this, the selector 18 disconnects an input of the optical signal from the optical fiber 14, and outputs an optical signal supplied from the optical fiber 24 to the terminal unit 3. That is, the selector 18 disconnects a connection between the optical fiber 14 and the terminal unit 3, and makes a connection between the optical fiber 24 and the terminal unit 3 to thereby switch a down-route line to be used by the terminal unit 3. Also, the selector 28 outputs an optical signal supplied from the terminal unit 3 to the optical fiber 25. That is, the selector 28 disconnects a connection between the optical fiber 15 and the terminal unit 3, and makes a connection between the optical fiber 25 and the terminal unit 3 to thereby switch an up-route line to be used by the terminal unit 3.

As described, when the switching between the service system and the protection system has been performed, the selector control section 30 sets the lines in current use (the optical transmission lines 21 and 22, and the optical fibers 24 and 25) as service system ones, and the other lines (optical transmission lines 21 and 22, and optical fibers 14 and 15) as protection system ones. Subsequently, the selector control section 30 continuously performs the selection control of an optical transmission line to be connected to the terminal unit 3 on the basis of pieces of alarm data to be obtained.

Subsequently, when the transmission line LOS occurs in the optical transmission line 21 in the service system down-route line, a monitoring section in the optical transmitting & receiving unit 23 outputs a tone signal corresponding to the transmission line LOS to a tone modulating section. The optical transmitting & receiving unit 23 outputs an optical signal modulated with the tone signal to the terminal side transmitting & receiving unit 10 through the optical fiber 24. At this time, in the case where the above-described failure has not been solved, the optical signal modulated with the tone signal is also outputted from the optical transmitting & receiving unit 13. In this case, the selector control section 30 of the terminal side transmitting & receiving unit 10 obtains the alarm data (error occurs in the protection system optical transmission line 11) from the tone detecting section 17, and alarm data (input signal disconnection from the transmission line in the service system optical transmission line 21) from the tone detecting section 27. The selector control section 30 refers to the determination condition table illustrated in FIG. 4, and controls the selectors 18 and 28 to switch between the service system transmission line and the protection system transmission line. Thus, the selector 18 switches between the service system transmission line and the protection system transmission line.

Similarly to the above, after the switching between the service system and the protection system has been performed, the selector control section 30 sets the lines in current use (the optical transmission lines 11 and 12, and the optical fibers 14 and 15) as service system ones, and the other lines (the optical transmission lines 21 and 22, and the optical fibers 24 and 25) as protection system ones. Subsequently, the selector control section 30 continuously performs the selection control of optical transmission lines to be connected to the terminal unit 3 on the basis of pieces of alarm data to be obtained.

In this case, in the case where the above-described failure has not been solved even if the switching between the service system and the protection system has been performed, the selector control section 30 obtains the pieces of alarm data (error occurs in the service system optical transmission line 11, and input signal disconnection from the transmission line in the protection system optical transmission line 21). However, according to the determination condition illustrated in FIG. 4, the switching control is not performed in this condition. That is, unless new failure occurs, the current lines are maintained.

Also, if any of the optical fibers between the line concentration station 1 and the terminal side unit mounted station 2 is disconnected, the switching control is performed on the basis of pieces of alarm data obtained from the PDs 16 and 26, and the determination condition table. At this time, in the case where failure is present in any of the optical transmission lines between the line concentration station 1 and the host station, the switching control according to a combination with pieces of alarm data from the tone detecting sections 17 and 27.

As described above, according to the present invention, optical transmission lines to be used for the service system can be determined according to a combination of failures in the down-route optical transmission lines 11 and 21 between the line concentration station 1 and the host station and failures in the optical transmission lines (optical fibers 14, 15, 24, and 25) between the line concentration station 1 and the terminal side unit mounted station 2. For this reason, reliability of an optical transmission system can be improved.

It should be noted that the switching between the service system and the protection system may only be performed once. Also, the selector 18 may switch only one of the up- and down-route lines as the protection system line according to a combination of the failures of the optical transmission lines 11 and 21 and failures in the optical transmission lines (the optical fibers 14, 15, 24, and 25) between the line concentration station 1 and the terminal side unit mounted station 2.

The failures (pieces of alarm data) of the optical transmission lines 11 and 21 detected in the line concentration station 1 can be notified to the terminal side unit mounted station 2 through the communication-use optical transmission lines (optical fibers 14 and 24). For this reason, the terminal side unit mounted station 2 installed with the selectors 16 and 26 and the line concentration station 1 can be separated far from each other. Also, according to the present invention, even if the terminal side unit mounted station 2 is installed in a remote station that is not the same station building as that for the optical transmitting & receiving unit mounted station 1, switching between the transmission lines can be performed with use of not only loss of optical signal but line break or loss of frame (out of synchronization) as a trigger, by using a tone signal.

Further, it is not necessary to newly provide a transmission line for notifying a failure between the line concentration station 1 and the terminal side unit mounted station 2, and therefore system cost can be suppressed.

The terminal side transmitting & receiving unit mounted station 2 may record pieces of alarm data (failures) obtained in the selector control section 30 in a storage device (not shown) as a history. In this case, all failures on transmission lines usable by the client terminal 3 can be grasped in the terminal side transmitting & receiving unit mounted station 2. Based on this, system maintenance/check related to the terminal unit 3 can be facilitated on a terminal unit side.

Also, in the present invention, switching between the service system and protection system is performed according to a combination of failures on the upstream and downstream sides with respect to the line concentration station 1. For this reason, a transmission line can be set depending on failure severity and failure location. At this time, the determination condition table recorded therein with a transmission line switching condition is used to be thereby able to set in detail the failure and failure location requiring the switching of the transmission line.

Further, according to the present invention, depending on a failure of a down-route line, not only the down-route line but also an up-route line can be switched simultaneously. Similarly, depending on a failure of an up-route line, the up-route line and the down-route line can be simultaneously switched. For his reason, a transmission line connected to the terminal unit 3 can be switched for each of the optical transmitting & receiving units 13 and 23. By switching a transmission line for each of the transmitting & receiving unit 13 and 23, an entire system including a transmitting & receiving unit connected to a transmission line in which failure occurs can be brought into an unused state. Based on this, failure shooting or failure recovery can be performed for each system including a transmitting & receiving unit.

Third Exemplary Embodiment

Figure 5:
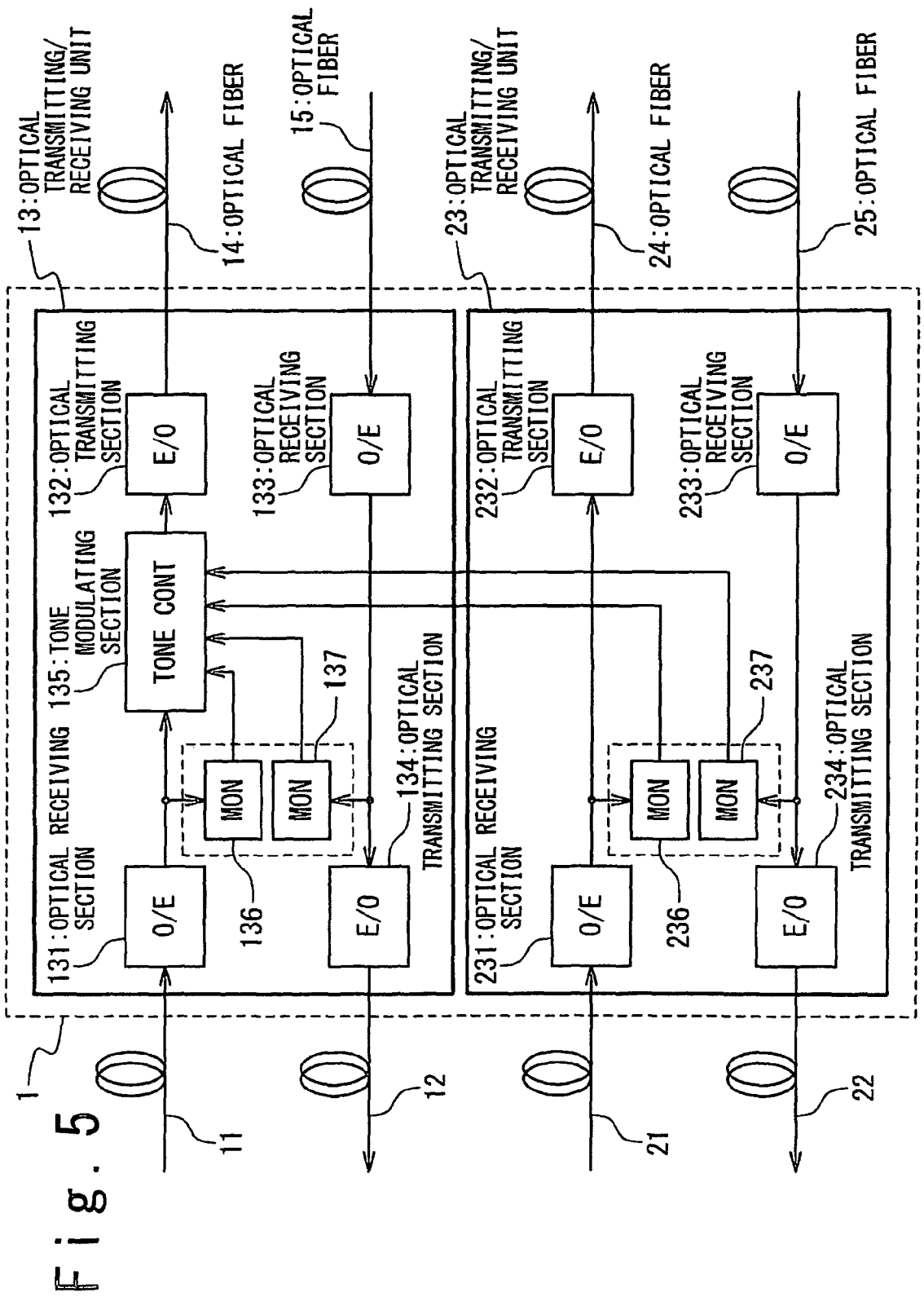
FIG. 5 is a diagram showing a configuration of an optical transmitting & receiving unit mounting station according to a third exemplary embodiment of the present invention.
Figure 6:
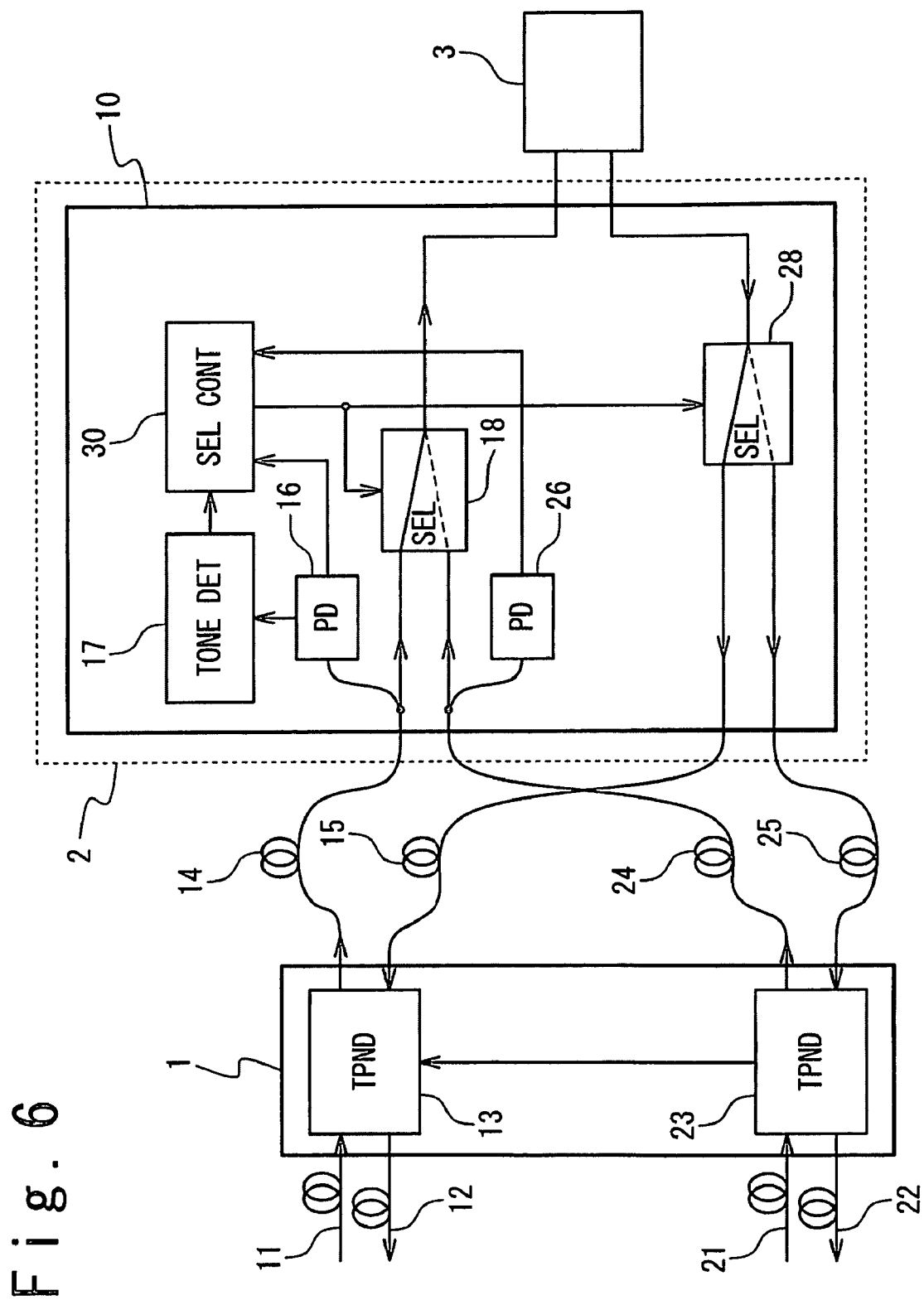
FIG. 6 is a diagram showing a configuration of the optical transmission system according to the third exemplary embodiment of the present invention.

Referring to FIGS. 5 and 6, a third exemplary embodiment of an optical transmission system according to the present invention will be described. A line concentration station 1 in the third exemplary embodiment is configured such that any one of optical transmitting & receiving units 13 and 23 includes a tone modulating section 135. We here assume that the tone modulating section 135 is provided in the optical transmitting & receiving unit 13.

In the following, portions different from the second exemplary embodiment are only described. The optical transmitting & receiving unit 23 includes optical receiving sections 231 and 233 and optical transmitting sections 232 and 234, which respectively have the same function as those of the optical receiving sections 131 and 133 and the optical transmitting sections 132 and 134. Also, the optical transmitting & receiving unit 23 includes monitoring sections 236 and 237. The monitoring section 236 analyzes an electrical signal into which an optical signal is converted in the optical receiving section 231, and monitors a failure of the optical signal from an optical transmission line 21, such as loss of signal, line break, and loss of frame (out of synchronization). The monitoring section 137 analyzes an electrical signal converted in the optical receiving section 133, and monitors a failure of the optical signal from an optical transmission line 13, such as loss of signal, line break, and loss of frame. It should be noted that each of the monitoring sections 236 and 237 outputs a tone signal having a frequency corresponding to a result of the monitoring to the tone modulating section 135 of the optical transmitting & receiving unit 13. The optical transmitting section 232 converts the electrical signal converted in the optical receiving section 231 into an optical signal, and outputs the optical signal to an optical fiber 24.

The tone modulating section 135 in the third exemplary embodiment uses tone signals supplied from the monitoring sections 136, 137, 236, and 236 to modulate an electrical signal (corresponding to a carrier wave of an optical signal supplied from an optical transmission line 11) from the optical receiving section 131 (tone modulation). It should be noted that the tone signal is set with a frequency having a value that is different for each of optical transmission lines having failure and for each of failure details (e.g., loss of frame).

FIG. 6 is a diagram showing a configuration of an optical transmission system in the third exemplary embodiment. Referring to FIG. 6, the terminal side transmitting & receiving unit 10 in the third exemplary embodiment has a configuration in which the tone detecting section 27 is removed from the terminal side optical transmitting & receiving unit 10 in the second exemplary embodiment. Also, a tone detecting section 17 identifies, from an extracted tone signal, a transmission line in which failure occurs, and outputs it along with alarm data indicating a failure detail to the selector control section 30. The selector control section 30 refers to a determination condition table as illustrated in FIG. 4 to control selectors 18 and 28, on the basis of the supplied failure detain and failure location (transmission line), In the optical transmission system according to the third exemplary embodiment, the number of tone modulating sections provided for each optical transmitting & receiving unit 10 can be reduced, and therefore a size and power consumption of the line concentration station 1 can be reduced. Also, the number of tone detecting sections in the terminal side transmitting & receiving 10 can be reduced, and therefore a size and power consumption of the terminal side unit mounted station 2 can also be reduced.

Further, in the tone modulating section 135, a tone signal from each of the monitoring units is analyzed, and a required tone signal may only be used to perform the tone modulation. For example, in the case where error rate deterioration (SD) of the optical transmission line 11 and optical input signal disconnection (LOS) of an optical fiber 25 are detected by the monitoring sections, the tone modulating section refers to the determination condition table (not shown) to tone-modulate a signal only with a tone signal corresponding to the optical input signal disconnection (LOS) of the optical fiber 25. Regarding a condition at this time, alarm severity is set in the order of LOS>LOF>SD>ERR>No alarm, similarly to the above. Because of this, the determination condition table referred to by the selector control section 30 can be simplified, and therefore a circuit area of the selector control section 30 can also be reduced.

In the above, the exemplary embodiments of the present invention have been described in detail; however, a specific configuration is not limited to any of the above-described exemplary embodiments, and any modification without desectioning from the scope of the present invention is included in the present invention. In the exemplary embodiments, there is described the case where the selector control section 30 refers to the determination condition table to perform the switching control of the transmission lines; however, without limitation to this, the selectors 18 and 28 may be automatically controlled by a flag configured on the basis of pieces of alarm data from the tone detecting sections 17 and 27. Also, the selector control section 30 may be configured with use of a logic circuit to control the selectors 18 and 28 according to signals from the tone detecting sections 17 and 27. It should be noted that, even in these cases, it is preferable to perform control according to the above-described determination condition. Also, even in the third exemplary embodiment, the same configuration can be made.

Further, in the above-described exemplary embodiments, the transmission system that is made redundant by the dual transmission lines has been described as an example; however, without limitation to this, there may be employed a configuration in which one of a plurality of transmission lines is set as a service system and the other transmission lines are set as a protection system.

What is claimed is:

1. An optical transmission system comprising:
   a first monitoring section configured to monitor a first optical signal on a first optical transmission line to detect a first failure;
   a modulating section configured to generate a second optical signal obtained through modulation of a signal corresponding to the first optical signal based on the first failure, to transmit the second optical signal onto a second optical transmission line which is connected with said first optical transmission line and a terminal unit;
   a second monitoring section configured to monitor the second optical signal on said second optical transmission line to detect a second failure;
   a detecting section configured to detect the first failure from the second optical signal on said second optical transmission line; and
   a line switch configured to selectively switch an optical transmission line to be connected with said terminal unit, from said second optical transmission line to another optical transmission line based on the first failure detected by said detecting section and the second failure detected by said second monitoring section.

2. The optical transmission system according to claim 1, further comprising:
   a determination condition table in which a combination of an optical transmission line to be disconnected from said terminal unit, the first failure and the second failure is stored,
   wherein said line switch refers to said determination condition table based on the first failure and the second failure, to determine connection of said another optical transmission line with said terminal unit.

3. The optical transmission system according to claim 1, wherein said first monitoring section is provided in a line concentration station, and said first and second optical transmission lines are connected through said line concentration station.

4. The optical transmission system according to claim 1, further comprising:
   a third optical transmission line for an up-route line from said terminal unit, wherein said first and second optical transmission lines are for a down-route line to said terminal unit; and
   a third monitoring section configured to monitor a third optical signal on said third optical transmission line to detect a third failure,
   wherein said modulating section generates the second optical signal obtained through modulation of the signal corresponding to the first optical signal based on the third failure, to transmit the second optical signal onto said second optical transmission line,
   said detecting section detects the third failure from the second optical signal on said second optical transmission line, and
   said a line switch switches the optical transmission line to be connected with said terminal unit, from said third optical transmission line to another optical transmission line based on the detected third failure.

5. The optical transmission system according to claim 4, further comprising:
   a determination condition table in which a combination of an optical transmission line to be disconnected from said terminal unit, the first failure, the second failure and the third failure is stored,
   wherein said line switch refers to said determination condition table to determine the optical transmission line to be connected with said terminal unit based on the first failure, the second failure and the third failure, to determine connection of said another optical transmission line with said terminal unit.

6. The optical transmission system according to claim 4, wherein said line switch switches said up-route line and said down-route line to other up- and down-lines based on the first failure, the second failure and/or the third failure.

7. The optical transmission system according to claim 1, wherein said modulating section generates the second optical signal obtained through tone-modulation of the signal corresponding to the first optical signal by using a tone signal corresponding to the first failure.

8. The optical transmission system according to claim 1, further comprising:
   a plurality of optical transmitting and receiving units configured to relay a plurality of said first optical signals on a plurality of said first optical transmission lines onto a plurality of said second optical transmission lines, respectively; and a terminal side optical transmitting and receiving unit configured to select one of said plurality of second optical transmission lines to connect with said terminal unit, wherein each of said plurality of optical transmitting and receiving units comprises said first monitoring section and said modulating section, and said terminal side optical transmitting and receiving unit comprises said second monitoring section, said detecting section and said line switch.

9. The optical transmission system according to claim 1, further comprising:

a plurality of optical transmitting and receiving units configured to relay a plurality of said first optical signals on a plurality of said first optical transmission lines onto a plurality of said second optical transmission lines, respectively; and a terminal side optical transmitting and receiving unit configured to select one of said plurality of second optical transmission lines to connect with said terminal unit, wherein each of said plurality of optical transmitting and receiving units comprises said first monitoring section, one of said plurality of optical transmitting and receiving units comprises said modulating section, said terminal side optical transmitting and receiving unit comprises said second monitoring section, said detecting section and said line switch, and said modulating section generates the second optical signal obtained through modulation of the signal corresponding to the first optical signal from any of said plurality of first monitoring sections based on the first failure on said plurality of first optical transmission lines.

10. An optical transmitting and receiving apparatus comprising:

a first monitoring section configured to monitor a first optical signal on a first optical transmission line to detect a first failure, said first optical transmission line connected with a terminal apparatus through a second optical transmission line; and a modulating section configured to generate a second optical signal obtained through modulation of a signal corresponding to the first optical signal based on the first failure to transmit the second optical signal onto said second optical transmission line, wherein an optical transmission line to be connected with said terminal apparatus is switched from said second optical transmission line to another optical transmission line based on the first failure detected from the second optical signal and a second failure detected from the second optical signal by a second monitoring section.

11. The optical transmitting and receiving apparatus according to claim 10, further comprising:

a third monitoring section configured to monitor a third failure of a third optical transmission line as an up-route transmission line from said terminal unit, wherein said first optical transmission line and a second optical transmission line connected with said first optical transmission line are for a down-route a terminal apparatus, wherein said modulating section generates the second optical signal obtained through the modulation of the signal corresponding to the first optical signal based on the third failure detected by said third monitoring section, to transmit onto said second optical transmission line, and said third optical transmission line to be connected with said terminal apparatus is selected from among a plurality of said third optical transmission lines based on the third failure.

12. The optical transmitting and receiving apparatus according to claim 11, wherein said modulating section generates the second optical signal obtain through the modulation of the signal corresponding to the first optical signal based on the first failure and the third failure to transmit onto said second optical transmission line, and wherein said terminal side transmitting and receiving apparatus selects said third optical transmission line to be connected with said terminal apparatus from among said plurality of third optical transmission lines based on the third failure.

13. The optical transmitting and receiving apparatus according to claim 10, wherein said modulating section generates the second optical signal obtained through the modulation of the signal corresponding to the first optical signal based on a failure detected by another optical transmitting and receiving apparatus.

14. The optical transmitting and receiving apparatus according to claim 10, wherein said modulating section generates the second optical signal obtained through the modulation of the signal corresponding to the first optical signal based on the first failure by using a tone signal, to transmit the second optical signal on said optical second transmission line.

15. An optical transmitting and receiving apparatus, comprising:

a detecting section configured to detect a first failure detected from a first optical signal on a first optical transmission line connected with a terminal apparatus through a second optical transmission line, from a second optical signal transmitted through said second optical transmission line;

a second monitoring section configured to monitor the second optical signal on said second optical transmission line to detect a second failure; and a line switch configured to selectively switch an optical transmission line to be connected with said terminal apparatus from said second optical transmission line to another optical transmission line based on the first failure and the second failure.

16. The optical transmitting and receiving apparatus according to claim 15, further comprising:

a determination condition table in which a combination of the optical transmission line to be disconnected from said terminal apparatus, the first failure and the second failure is recorded, wherein said line switch refers to said determination condition table based on the first failure and the second failure to determine said another optical transmission line to be connected with said terminal apparatus.

17. The optical transmitting and receiving apparatus according to claim 15, wherein said line switch switches a down-route optical transmission line and an up-route optical transmission line to be connected with said terminal apparatus from among a plurality of optical transmission lines based on the first failure and the second failure.

18. The optical transmitting and receiving apparatus according to claim 15, wherein said detecting section detects a third failure from a third optical signal on a third optical transmission line as said up-route transmission line from said terminal apparatus, and said line switch switches the optical transmission line to be connected with said terminal apparatus to another optical transmission line based on the third failure detected by said detecting section.

19. The optical transmitting and receiving apparatus according to claim 18, further comprising:

a determination condition table in which a combination of the optical transmission line to be disconnected from said terminal unit, the first failure, the second failure and the third failure is recorded, wherein said line switch refers to said determination condition table based on the first failure, the second failure and the third failure to determine the optical transmission line to be connected with said terminal apparatus.

20. The optical transmitting and receiving apparatus according to claim 18, wherein said line switch selectively switches a down-route transmission line and an up-route transmission line to be connected with said terminal apparatus from among a plurality of optical transmission lines based on the first failure, the second failure and the third failure.

21. An optical transmission method comprising:

monitoring a first optical signal on a first transmission line connected with a terminal unit through a second optical transmission line, to detect a first failure;

modulating an signal corresponding to said first optical signal on said first optical transmission line based on the first failure to transmit a second optical signal on said second optical transmission line;

monitoring a second failure from the second optical signal on said second optical transmission line;

detecting the first failure from the second optical signal on said second optical transmission line; and switching an optical transmission line to be connected with said terminal unit from said second optical transmission line to another optical transmission line based on the first failure and the second failure.

22. The optical transmission method according to claim 21, wherein said switching comprises:

selecting a down-route transmission line and an up-route transmission line to be connected with said terminal unit from among a plurality of optical transmission lines based on the first failure and the second failure.

23. The optical transmission method according to claim 21, further comprising:

monitoring a third failure on a third optical transmission line connected with said terminal unit;

modulating the signal corresponding to said first optical signal on said first optical transmission line based on the third failure to transmit the second optical signal on said second optical transmission line;

detecting the third failure from the second optical signal on said second optical transmission line;

switching an optical transmission line to be connected with said terminal unit from said third optical transmission line to another optical transmission line based on the third failure.

24. The optical transmission method according to claim 21, wherein said modulating comprises:

modulating the signal corresponding to said first optical signal on said first optical transmission line based on a tone signal corresponding to the first failure.

* * * * *